T. E. UNKS.
OPERATING MEANS FOR WASHING MACHINES.
APPLICATION FILED SEPT. 19, 1913.

1,142,543.

Patented June 8, 1915.

Witnesses
P. Laughmady
W. H. Brereton

Thomas E. Unks, Inventor
by A. H. Mess, Attorney

UNITED STATES PATENT OFFICE.

THOMAS EDWIN UNKS, OF SANDUSKY, OHIO.

OPERATING MEANS FOR WASHING-MACHINES.

1,142,543.  Specification of Letters Patent.  Patented June 8, 1915.

Application filed September 19, 1913. Serial No. 790,682.

*To all whom it may concern:*

Be it known that I, THOMAS E. UNKS, a citizen of the United States, residing at Sandusky, in the county of Huron and State of Ohio, have invented new and useful Improvements in Operating Means for Washing-Machines, of which the following is a specification.

This invention relates to certain new and useful improvements in operating means for washing machines, and has for its primary object, the provision of improved means, of simple and economical construction, for imparting combined vertical reciprocatory, and alternating rotary movement to the tub.

Figure 1:
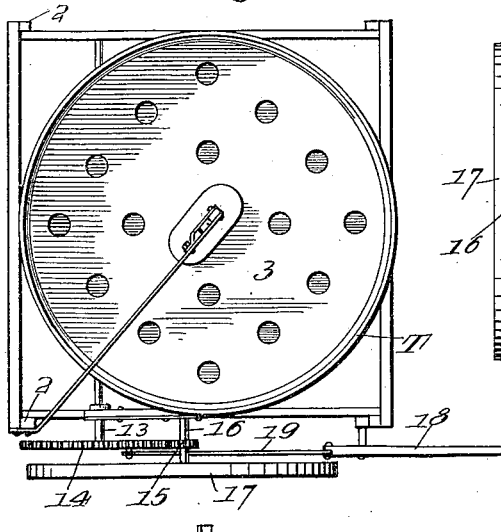
Figure 3:
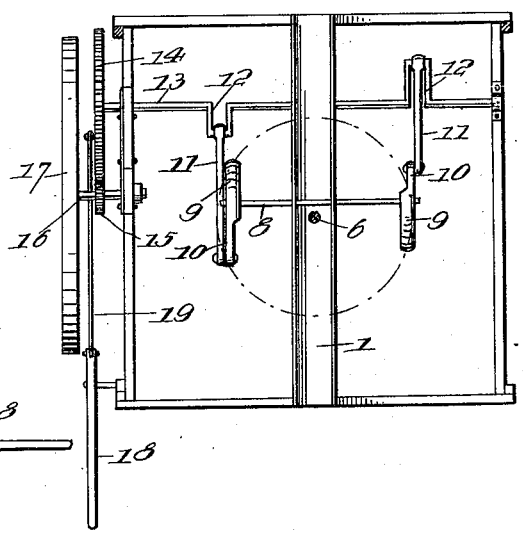
Figure 2:
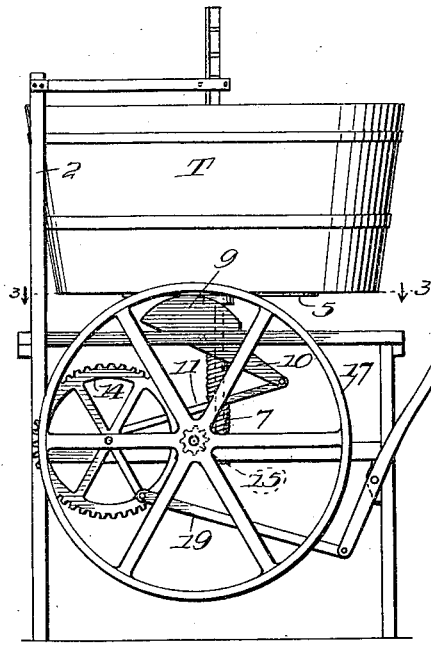
Figure 4:
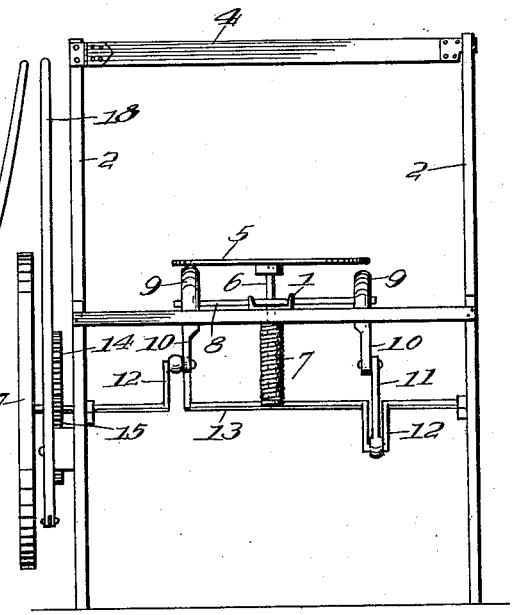

In the drawings: Figure 1 is a top plan view of the invention; Fig. 2 is a side elevation; Fig. 3 is a section taken on the line 3—3 of Fig. 2; and Fig. 4 is a front elevation, the tub and rub board being omitted.

In proceeding in accordance with the invention, a frame is provided which includes a horizontal U-bar 1, and end standards 2, the latter having the rub-board 3, suitably connected thereto, as well as the wringer-board support 4.

A disk or plate 5, has a stem 6, which depends therefrom and extends through an aperture provided therefor in the U-bar 1, a spring 7, encircling the lower portion of the stem so as to exert downward tension on the disk. The tub T seats on the upper face of the plate 5, and receives the rub-board on its interior.

A short shaft 8 extends through openings provided therefor in the sides of the U-bar 1, and supports a pair of cams 9 at its opposite ends. The cams are reversely arranged, or disposed, and have frictional contact with the under face of the disk or plate 5, so as to alternately rotate or move the disk clockwise and counterclockwise. Each cam 9, has a stem or shank 10, which depends therefrom, the free lower ends of the shanks 10, being pivotally connected to links 11, the links in turn being pivotally connected to cranks 12 formed on a shaft 13, the cranks being arranged to extend in opposite directions, as depicted in Figs. 2 and 3, of the drawings. A comparatively large gear 14, is secured to the shaft 13 so as to rotate the latter, the gear 14, being in mesh with a pinion 15, that is keyed to a short shaft 16, which is journaled in the frame, and has the fly or balance wheel 17, connected thereto. An operating lever 18, is in pivotal connection with the frame, and has a link 19, pivoted thereto, the link being pivoted to the large gear 14, so that oscillatory movement manually imparted to the lever 18, will, through the medium of the link 19, rotate the gear 14.

In operation, rotation of the gear 14, in a manner above described, causes rotation of the crank shaft 13, and the latter effects oscillatory movement of the cams 9. The cams 9, which frictionally bear against the bottom face of the disk or plate 5, impart alternating rotary movement thereto, and also cause the plate to be vertically reciprocated, the alternating rotary movement of the plate being due to the opposite disposition of the cams 9, which oscillate in opposite directions. The cams, as well as the disk or plate 5, are devoid of teeth, and are possessed of smooth surfaces, which enable inexpensive production of the parts.

By directly connecting each cam to the crank shaft, the latter effects a direct operation of the cams, and in addition by providing the cams with comparatively long shanks, greater leverage is obtained which enables the cams to raise the disk with the expenditure of less power by the operator.

What is claimed is:

1. In combination with a support adapted to have vertical and rotatable movement, a shaft having a pair of oppositely disposed cranks thereon, a second shaft, oppositely disposed cams each secured on the second shaft having comparatively long depending shanks, said cams alternately engaging the under face of the support to impart vertical reciprocatory and alternating rotary motion to the support, links directly connected to the respective cranks and shanks, and means to effect rotation of the first mentioned shaft.

2. In combination with a vertically movable support, a pair of oppositely disposed cams having depending shanks, said cams alternately rotating the support by engaging the under face of the support, and means connected to the shanks of the cams to oscillate the latter in opposite directions.

3. In combination with a vertically movable support, a pair of oppositely disposed cams for alternately rotating the support by engagement with the under face of the support, means pivotally connected to each cam for operating same, and a crank shaft to which each of said means is pivoted.

4. In combination with a vertically movable and rotatable support, a pair of rocking cams which engage with the under face of the support, and means to impart oscillatory movement to the cams in opposite directions to impart vertical reciprocatory and alternating rotary motion to the support.

5. In combination with a vertically movable support, a rotatable member, means to impart continuous rotary movement to said member, means to impart alternating rotary and vertical reciprocatory movement to said support, and means connecting the rotatable member with said first named means whereby the latter is given oscillatory movement.

6. In combination with a frame, a shaft supported by the frame and having oppositely disposed cranks thereon, a second shaft journaled in the frame and having a pair of oppositely disposed cams thereon, links pivotally connecting the cranks and cams, a supporting disk having a depending stem rotatably and slidably supported in the frame, means for yieldably holding said disk in its lowermost position, and means for rotating the crank shaft for oscillating the cams, whereby the same alternately engage the supporting disk to impart vertical and oscillatory movement to the supporting disk.

In testimony whereof I have hereunto set my hand in presence of two subscribing witnesses.

THOMAS EDWIN UNKS.

Witnesses:
JOHN PHILIP FRICK,
OSCAR HERMANN.

Copies of this patent may be obtained for five cents each, by addressing the "Commissioner of Patents, Washington, D. C."